Oct. 8, 1940.   F. K. FLOYD   2,217,220
ELECTRIC MEASURING APPARATUS
Filed Dec. 17, 1938
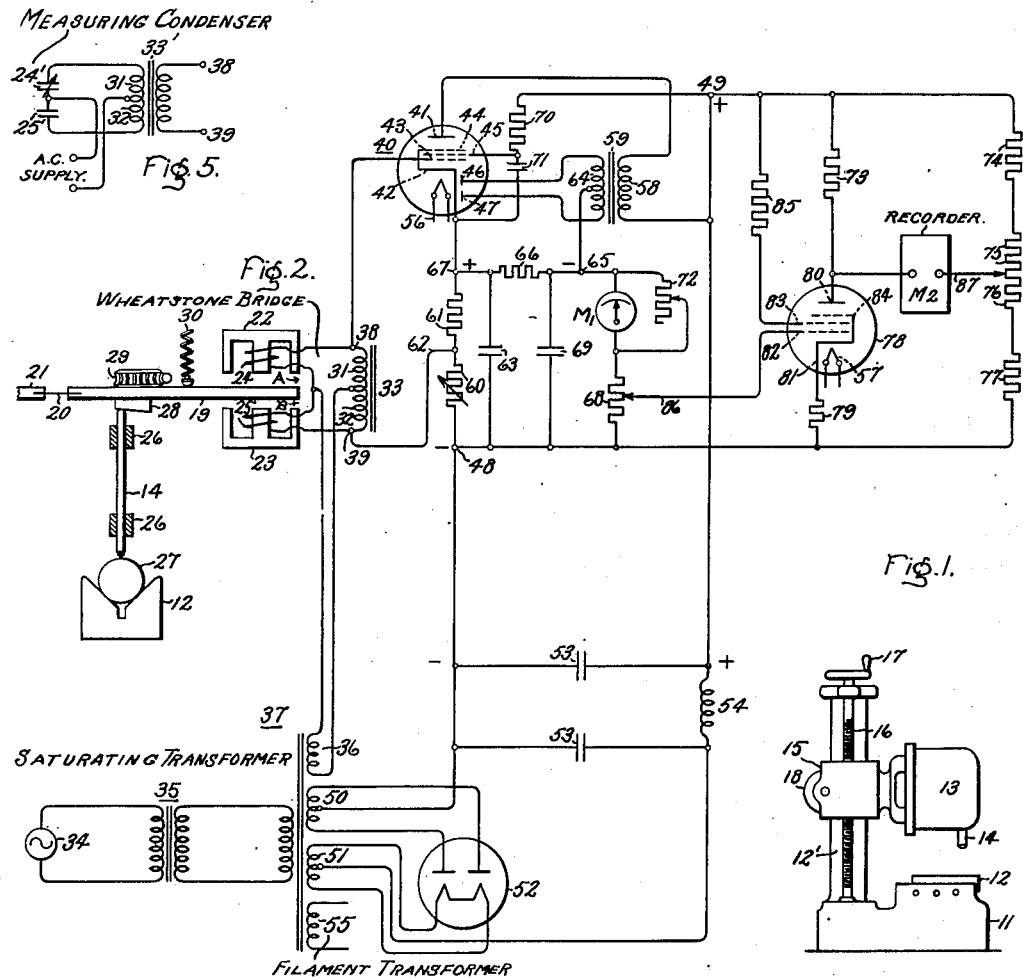
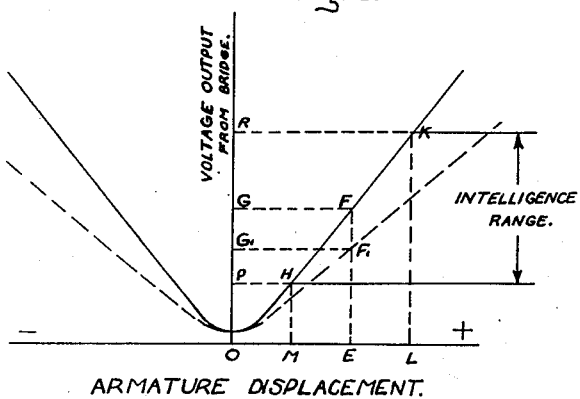
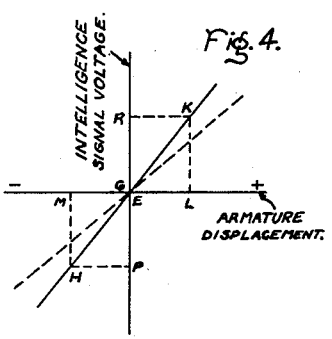
Inventor:
Frederick K. Floyd,
by Harry E. Dunham
His Attorney.

Patented Oct. 8, 1940

2,217,220

UNITED STATES PATENT OFFICE 2,217,220

ELECTRIC MEASURING APPARATUS

Frederick K. Floyd, Scotia, N. Y., assignor to General Electric Company, a corporation of New York Application December 17, 1938, Serial No. 246,417

9 Claims. (Cl. 171—95)

This invention relates to improvements in electric measuring apparatus for measuring alternating current quantities, and more particularly to electric measuring apparatus including alternating current bridges of the unbalanced type for measuring alternating current quantities.

In the measurement of certain quantities or qualities, for example, temperature, pressure, tension, compression, strain, weight, dimensions, humidity, resistance, inductance, capacity, and others, alternating current bridges or differential circuit arrangements are frequently employed. In certain of these measurements a variation in the quantity or quality being measured effects a change in the value of one or more of the quantities (such as resistance, inductance, or capacitance) composing the arms of the bridge or differential circuits, while in other measurements it may be desired to measure the actual quantity or quality of the element or elements composing the arm or arms of the bridge or differential circuit itself. In either case it has been found desirable and sometimes necessary to maintain the unbalance of the bridge or differential circuit above a predetermined minimum amount for all conditions of measurement. To provide a highly sensitive device this unbalance should be balanced out in the measuring circuit for the zero or reference position so that the indicating instrument reads zero at the reference position and indicates directly in proportion to the deviation from the original unbalance. Furthermore, such a device should be so arranged that the sensitivity control and zero adjustment are independent of each other.

In the bridge type of electrical gauge, such as illustrated, for example, in Mershon Patent 1,879,388, it is common to employ a simple Wheatstone bridge circuit arrangement with similar iron core reactors that contain air gaps in two arms, these gaps being formed by a common magnetic member which is movable in accordance with variations in the quantity or quality being measured. If an alternating voltage is applied across two of the arms of the bridge and if an indicating circuit including an instrument is connected across the other two arms, the instrument will indicate zero when the two gaps are equal which is the condition corresponding to magnetic equilibrium for the two magnetic circuits. In this case, the movable magnetic member occupies a position midway between the tips of the two magnetic cores. A movement of the magnetic member in either direction from this mid-position increases one air gap and decreases the other, thereby oppositely changing the reluctance of the respective magnetic circuits and producing a corresponding change in the reactance of the coils to unbalance the bridge and produce an indication on the instrument.

The operation of such gauges within the vicinity of the point where the movable magnetic member is midway between the two magnetic cores is highly unsatisfactory because, first, the characteristic is not linear in this region, i. e. the ratio of response or signal voltage output from the bridge to displacement of the movable magnetic member is no longer constant; second, since the curve tends to flatten out in this region the sensitivity of the indicating instrument is so greatly reduced as to make it difficult if not impossible to obtain accurate measurements; and third, as the magnetic member is moved from one side of neutral toward the mid-position the instrument will indicate successively smaller values until at mid-position the indication reaches a minimum. Then as the magnetic member is moved farther in the same direction to the other side of the mid-position the instrument will indicate successively larger values, so that it is impossible to tell from the instrument reading which side of the mid-position the armature is located. The instrument will thus indicate ambiguously if the armature or magnetic member is operated in the range which includes the mid-position.

It is therefore necessary to operate the armature at one side of the mid-position only and it is desirable to operate the armature far enough away from the mid-position so that it never falls in the region of non-linear characteristic which exists at and near the point of mid-position. When the armature is operated in this way the zero or reference position of the armature is taken as some point far removed from the mid-position of the armature and the armature moves in either direction from this point while making measurements. With such an arrangement there appears a voltage across the bridge output terminals due to the unbalanced condition, even when the armature occupies the zero reference position. This means that the signal output voltage from the bridge is a fixed alternating voltage plus or minus a small alternating voltage when the gauge armature is offset a certain distance from its magnetic neutral position and then operated up and down from that point.

According to my knowledge this fixed value of voltage has not been balanced out in such a way that an adjustment of the sensitivity of the gauge circuit will not disturb the zero setting of the instrument which indicates or records the unbalance or signal intelligence from the gauge circuit. Thus it has been necessary to readjust the zero setting of the instrument or instruments each time the sensitivity is changed, which means, that in order to adjust the sensitivity to a predetermined value a trial and error method is required.

The electrical measuring apparatus of my invention includes indicating and recording instruments associated with novel means to balance out this initial unbalance of the bridge in such a way that the sensitivity control and zero adjustment are independent of each other.

An object of my invention is to provide a novel means whereby this fixed signal voltage may be balanced out so that for the zero reference point a zero reading may be obtained on the instrument which indicates or records the intelligence.

Another object of my invention is to employ an electron discharge device for amplifying the bridge output voltage including the fixed component and the component of voltage which is a function of the quantity being measured and to utilize a constant voltage drop in a portion of the circuit of the discharge device of such a value as to balance out the fixed component of voltage which occurs at the arbitrary zero reference point.

Still another object of my invention is to provide electric measuring apparatus including an amplifier and balancing means and indicating and recording means having sensitivity control and zero adjustment which are independent of each other.

A further object of my invention is to provide improved means for amplifying and measuring alternating current quantities.

A still further object of my invention is to provide a highly sensitive device for measuring small variations or deviations in comparatively large electrical quantities.

In carrying out my invention in its preferred form the movable armature of an electric gauge having two differential alternating current circuits is adjusted to an off-center position for the zero reference point, thereby causing an unbalance, and the resulting output voltage from the gauge is impressed on the control electrode of an electron discharge device. A resistance is placed in the plate circuit, next to the cathode, and a portion of the voltage drop which appears across this resistance is used for biasing the grid negatively with respect to the cathode. Means is provided for deriving a rectified direct current voltage proportional to the alternating component of the plate current of said discharge device, which component includes the fixed output voltage and a component of voltage proportional to the quantity or quality being measured. A measuring instrument is connected to indicate the difference between the voltage drop which appears across the resistance in the plate-cathode circuit and the rectified D. C. voltage. With the movable armature positioned at the zero reference point, the resistance in the plate-cathode circuit is adjusted until the indicating instrument reads zero. The measuring instrument properly calibrated then deflects in proportion to the magnitude of the quantity or quality being measured. To control the sensitivity a variable resistance is connected in shunt with the indicating instrument. In addition, means is provided for continuous recording of an electrical quantity proportional to the signal output voltage or intelligence from the gauge circuit.

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawing in which Fig. 1 is an assembly view in elevation of one type of apparatus which may be used with my invention; Fig. 2 is a side elevation of mechanism included in the gauge head of the apparatus of Fig. 1, and a circuit diagram representing an embodiment of my invention which may be used with the apparatus of Fig. 1; Figs. 3 and 4 are explanatory characteristic curves which will be referred to in describing my invention; and Fig. 5 is a modified form of apparatus which may be used with my invention.

While my invention is not limited to apparatus for gauging dimensions of mechanical parts, such apparatus forms a very useful application, and in Fig. 1, I have illustrated apparatus for measuring outside dimensions of small parts such as blocks, rods, gears, etc. The apparatus of Fig. 1 consists of a base 11 carrying a removable platen 12 upon which a piece to be gauged may be placed. A post 12', attached to the base 11, carries a gauge head 13, with a movable spindle 14 adapted to come in contact with the upper surface of a piece resting upon the platen 12, so that the position of the spindle 14 within the gauge head 13, as measured by the apparatus, depends upon the dimensions of the piece being gauged. In order to adapt the gauge to the measurement of pieces varying widely in dimensions, the gauge head 13 may be adjustably secured to post 12' by means of an adjustable support 15 arranged to slide vertically on the post 12' and including a threaded nut, not shown, adapted to cooperate with a screw 16 which may be turned by hand with a crank 17. A clamping screw 18 may be provided for tightening the adjustable support 15 at any given position on the post 12'.

The gauge head 13 as shown in Fig. 1 is mounted in a casing with only the spindle 14 projecting therefrom. A schematic diagram of the gauge elements which are enclosed within the casing is shown in the left-hand portion of Fig. 2. The magnetic armature 19, which may be a steel bar, is pivoted at one end by a flat steel spring 20. The other end of the spring is rigidly attached to the gauge head 13 through the intermediate member 21. The E-shaped cores 22 and 23, about which are wound coils 24 and 25 respectively, may be adjustably fixed to the casing of the gauge head 13, and are spaced from each other a sufficient amount to allow the free end of the armature 19 to be inserted therebetween and leave air gaps A and B on either side of the armature 19. The armature is moved by the spindle 14 which slides in bearings 26 and which has one end bearing against the work 27. A cam 28 located between the armature 19 and the upper end of the spindle 14 and adapted to be rotated by a worm 29 provides means for regulating the position of the armature 19 between the tips of the cores 22 and 23 to provide a fine zero adjustment if desired. A helical compression spring 30 which is attached to the casing of the gauge head 13 urges the magnetic armature 19 downward to hold the surface of cam 28 in engagement with the upper end of spindle 14.

Referring further to Fig. 2, which also shows the electrical circuit diagram, two differential alternating current circuits comprising windings 24 and 25 and windings 31 and 32 of a transformer 33, form a Wheatstone bridge. An alternating current source 34 is connected to the bridge at the junction of windings 24 and 25 and at the junction of windings 31 and 32 of transformer 33 by means of a saturating transformer 35 and one of the secondaries 36 of a second transformer 37. The transformer 35 maintains a substantially constant voltage on the primary winding of transformer 37. The windings 24 and 25 have as nearly as possible the same resistance and inductive reactance, as do the two windings 31 and 32 and the two latter windings wound on the same core of transformer 33 are connected to oppose each other. Assuming equal magnetic reluctances as between similar windings 24 and 25 and as between similar windings 31 and 32, there will exist two differentially balanced alternating current circuits. One circuit consists of the alternating current voltage supplied from the secondary winding 36 and windings 24 and 31, and the other circuit consists of the alternating current voltage supplied from the secondary winding 36 and windings 25 and 32 and, under this differentially balanced condition with the armature 19 substantially centrally located between the tips of the cores 22 and 23, there will be no difference of potential between the points 38 and 39 for the same conditions of saturation in the cores of the various windings. However, if the reluctance of the magnetic circuits of windings 24 and 25 is respectively increased and decreased by moving the armature 19 in such a direction as to simultaneously increase air gap A and decrease air gap B, and vice versa, the two alternating current circuits will no longer be balanced and a difference of potential will exist between the points 38 and 39, the output terminals of the bridge. It will, of course, be obvious that corresponding motion of the armature 19 in either direction will give the same alternating voltage output at the terminals 38 and 39.

Fig. 3 shows the relationship between the output signal voltage and the armature displacement from the neutral or mid-position. It will be observed that due to the use of corresponding parts which are not identical a small potential difference existed across the terminals 38, 39 even with the armature 19 in the neutral position. As indicated heretofore for that portion of the curve within the vicinity of the zero point the response for a given armature displacement is not linear and the sensitivity is greatly reduced. Also, it will be noted that if the armature is displaced an equal amount to either side of the neutral point, an indicating instrument would read the same in either case, making it impossible to tell from the instrument reading whether the test piece is smaller or larger than the dimension corresponding to the mid-position of the armature.

For purposes of illustration, it has been assumed that for the zero reference point, the armature is displaced E units to the right of the neutral position (which as previously described is necessary for satisfactory operation), thereby decreasing one air gap and increasing the other. This gives a point F on the curve and corresponds to a voltage output OG at the terminals 38, 39. It is assumed that the material being gauged is such that the range lies between the points K and H which correspond to armature displacements of OL and OM and voltage outputs of OR and OP respectively.

If the voltage OG in Fig. 3 is balanced out by one means or another, and if the point F on the curve corresponding to an armature displacement E units from the mid-position is taken to be the zero reference of armature movement, then the curve of intelligence signal or instrument deflection versus armature deflection or quantity being measured becomes as shown in Fig. 4. Referring to this figure, the intelligence signal voltage is zero when the armature is at its zero or reference position and the signal voltage is plus GR (which is equal to OR minus OG) when the armature is moved from E to L, and the signal voltage is minus GP (which is equal to OP minus OG) when the armature is moved from E to M. If the instruments are made to register the intelligence produced by the characteristic shown in Fig. 4, the instruments will register positive for a positive deflection of the armature, zero for zero deflection, and negative for negative deflection of the armature. Thus all of the output signal voltage is removed which does not contain intelligence. It is then clear that if the sensitivity, or multiplication, or ability to magnify is changed, the zero or reference point on either the indicating instrument or recording instrument is not changed because, regardless of the sensitivity, the zero of each instrument remains at the point of zero intelligence or at point E on the curve shown in Fig. 4. Changing the sensitivity merely rotates the curve in Fig. 4 about point E, as shown by the dotted line.

This ability to change sensitivity without altering the zero or reference point of either instrument is not possible with the characteristic as shown in Fig. 3, because there a change in sensitivity produces the dotted curve as shown. If the sensitivity is changed in this case, where E is the zero reference position of the armature, the same as with the solid curve, the signal corresponding to that armature position is now $OG_1$ which is not the same as OG; hence when the sensitivity is changed, the zero reference point of the instrument measuring the intelligence has also changed. Thus when such a characteristic is used it is necessary to adjust the sensitivity of the measuring device by means of trial and error methods, since for each setting of sensitivity there is an accompanying change in the zero reference of the instrument.

In order to balance out the signal voltage OG which appears across the terminals 38, 39 when the armature 19 is displaced E units from the neutral position or the position where the air gaps A and B are equal, and, also to provide amplification of the signal voltage, I employ the circuit of Fig. 2 including an electron discharge device 40. This device, for purposes of illustration, is of the duplex-diode pentode type combining a pentode type amplifier and a full-wave rectifier within a single enclosure. However, the use of such a device is merely one of convenience for it is obvious that my invention is not limited to the use of such an arrangement, but may be carried out by other means. For example, I may use a three element thermionic valve having the usual cathode, anode, and control electrode and I may employ a separate rectifier element of any well-known type.

The numerals 41, 42, 43, 44, and 45 designate respectively the anode, cathode, control electrode, suppressor grid and screen grid of the thermionic device 40, while 46 and 47 represent the anode elements of the full wave rectifier. The indirectly heated cathode 42 serves as a common cathode for both the amplifying portion of the tube and the rectifying element. Terminals 48 and 49 represent a source of direct current supply obtained from alternating current source 34, having the usual commercial frequency, by means of transformer 35, windings 50 and 51 of transformer 37, the full-wave rectifier element 52, and the usual smoothing filter including condensers 53 and inductance 54. The secondary winding 55 of transformer 37 supplies current for heating filaments 56 and 57 of thermionic devices 40 and 78 respectively. The plate circuit of amplifier 40 is connected in series with the direct current source 48, 49, the primary 58 of the transformer 59, and the resistance elements 60 and 61, the latter two resistance elements being connected in the plate-cathode circuit between the negative power supply line terminal 48 and the cathode 42. The lead 62 connects the control electrode 43 to the cathode circuit at a point between the resistance elements 60, 61 in order to negatively bias the control electrode 43 with respect to the cathode 42. The alternating potential variations or signal voltages from the bridge which are to be amplified and which appear across the terminals 38 and 39 are injected into the input circuit and superimposed upon the steady voltage across resistance element 61 between the control electrode and the cathode. The potential variations in the control electrode-cathode circuit consist of a rise above and fall below the mean negative potential of the grid or control electrode relative to the cathode. The source of current 48, 49 provides a continuous flow of current through the plate circuit of the amplifier 40, and this flow of current is varied in accordance with the signal alternations appearing across terminals 38, 39 of the transformer 33, due to the amplifying action of the discharge device 40 so that an alternating component of current now flows from the plate to the cathode thru the primary 58 of transformer 59. This alernating component of the plate current does not pass through the resistance elements 60, 61 due to the by-pass condenser 63. As will be explained presently, it is the voltage across resistance elements 60, 61 which is used for balancing out the signal voltage OG, as shown in Fig. 3, which occurs at the zero reference point of the armature.

The alternating component of plate current flowing through the primary 58 of transformer 59 induces a corresponding alternating voltage in the secondary 64, the end terminals of which are connected respectively to anodes 46 and 47 of the rectifier element of thermionic device 40. The mid-point of the secondary winding 64 is connected to terminal 65 of resistance element 66; the other terminal 67 of resistance element 66 is connected respectively to the cathode 42 and one terminal of resistance 61. With such an arrangement a unidirectional voltage of the polarity indicated and proportional to the gauge output or signal voltage always appears across resistance 66. It will thus be seen that the voltage existing across the resistance 66 is a fixed value OG, corresponding to position E of the armature 19, plus a small value corresponding to armature movement within the range EL or minus a small value corresponding to armature movement within the range EM, as the case may be. An indicating instrument $M_1$ such as a zero-center direct current milliammeter is connected in series with a high resistance 68 between the points 48 and 65 to read the voltage difference between the voltage which appears across resistance 60—61 and resistance 66. This instrument then registers the intelligence according to the characteristics as shown in Fig. 4. A condenser 69 is connected in parallel with the instrument circuit to filter out any direct current ripple which may be present in the voltage between terminals 48 and 65. The voltage drop across resistance 70 due to the screen grid current lowers the voltage on screen grid 45 with respect to the anode 41 in a well known manner, while the condenser 71 connecting the screen grid 45 with the cathode 42 serves to hold the voltage constant on the screen grid.

To adjust the device for operation a work piece of standard or some reference dimension is placed in the platen 12, and the crank 17 and worm 29 are adjusted until the armature is displaced to a position approximately E units from its neutral position, thereby causing a gauge output voltage OG across the terminals 38, 39 resulting in a proportional unidirectional voltage across the terminals 65 and 67 of resistance 66. The resistance 60 is then adjusted until the combined voltage drop across resistances 60 and 61 is equal to the voltage across resistance 66 which equality is evidenced by a zero indication on the instrument $M_1$. Since the voltage across resistance 66 is always proportional to the signal voltage input at 38, 39 to the control electrode 43, and inasmuch as the constant voltage across resistances 60 and 61 is connected in opposition to and balances out the voltage across resistance 66 for the zero position of the armature 19, it is clear that the indicating instrument $M_1$ will deflect in a plus or minus direction as in Fig. 4 depending on the deviation of the work-piece from one of standard or reference dimensions.

Sensitivity adjustment may be made by placing an object of known deviation from the standard or reference dimension in the gauge and then merely adjusting the setting of rheostat 72 in shunt with the instrument $M_1$ until the desired deflection is obtained on the instrument. Other deviations will of course produce proportionally greater or less deflections. Due to the fact that the voltage across resistances 68 and 72 is always zero when the gauge armature is set for the zero reference position and the instrument is on zero, it is obvious that adjustment of resistance 72 to control the sensitivity will not change the zero setting of the instrument.

In order to make recordings proportional to the deviation of the work-piece from one of standard or reference dimensions, I employ a Wheatstone bridge circuit arrangement having resistances 73, 74—75, and 76—77 respectively in three of its arms and an electron discharge amplifying device 78 and resistance 79 in the remaining arm. The bridge circuit is supplied with operating potential across one diagonal from terminals 48 and 49 of the direct current power supply. The recording instrument $M_2$ which may be a milliammeter is connected across the other diagonal of the bridge. For convenience the thermionic device 78 has been shown as one of the pentode type having an anode 80, cathode 81, control electrode 82, screen grid 83, and suppressor grid 84. The suppressor grid 84 is connected directly to the cathode 81 and the screen grid 83 is connected to the positive terminal 49 of the power supply through resistor 85 in a well known manner. The voltage drop across resistor 79 provides means for negatively biasing the control electrode 82 with respect to the cathode 81. While I have shown a five-element discharge tube 78 this is merely a matter of choice as it is obvious that I may use, for example, a three element tube having anode, cathode, and control electrode respectively. The control electrode 82 is connected to the cathode 81 through the tap 86 of the potentiometer or resistance 68 and through resistance 79.

With the instrument $M_1$ adjusted to indicate zero, as already explained, the voltage across the potentiometer 68 will be zero and the corresponding zero or reference position of the recording instrument $M_2$ may be set at any desired point by means of the tap or connection 87 to potentiometer 75—76. The sensitivity of $M_2$ may be adjusted by placing a piece in the gauge of known deviation from the standard or reference dimension as described in connection with the adjustment of the sensitivity of $M_1$, and adjusting the tap 86 until $M_2$ records the desired amount.

By virtue of the fact that the voltage across 68 and 72 is always zero when the gauge armature is at the zero reference point and the instruments are on zero, adjustment of 86 and 72 will not change the zero setting of either the indicating instrument $M_1$ or the recording instrument $M_2$. Nor will adjusting the zero position of $M_2$ affect the sensitivity of $M_2$ because the current in the legs of the bridge is high compared to the current through $M_2$.

Thus to operate the gauge adjustments are made as described until the indicating instrument $M_1$ reads zero, at which point the armature is exactly in the correct operating position and the gauge is ready for use. The sensitivity of either instrument may then be adjusted at will without affecting the reference point of either instrument $M_1$, or $M_2$ or the sensitivity of the other instrument; and the reference position of the recording instrument may be adjusted at will without affecting the sensitivity of either instrument $M_1$ or $M_2$ or the reference point of the indicating instrument $M_1$.

I have thus provided improved electrical measuring apparatus which may be successfully employ with diverse arrangements of unbalanced bridge or differential circuits in which variations in the quantity or quality being measured produce corresponding changes in the unbalance of the bridge by altering the impedance of one or more of the elements comprising the bridge, thus making it possible to derive a voltage which is a function of the quantity or quality being measured. The apparatus may also be employed in the direct measurement of the impedance of the element or elements comprising the bridge itself.

Magnetic bridges of the type shown in Fig. 2 find many useful fields of application such as in the measurement of strain, pressure, compression, tension, temperature, weight, vibration, dimensions of various articles including thickness of materials, and the like. In such applications variations in the quantity or quality being measured effect a change in the reluctance of the magnetic circuit and thus produce a proportional unbalance in the bridge.

In Fig. 5 I have shown a modified form of bridge arrangement which may be used with my invention wherein the magnetic circuit arrangement of Figs. 1 and 2, comprising coils 24 and 25 and cores 22 and 23, is replaced by two condensers 24' and 25'. In this case I have also shown the transformer 33 of Fig. 2 replaced by transformer 33' having a secondary winding with terminals 38 and 39, but this substitution is merely a matter of choice. Condenser 24' represents a condenser the capacity of which is varied in accordance with variations in the quantity or quality being measured either by allowing the material having the quality or quantity to be measured to pass between the plates of the condenser or by moving one of the plates with respect to the other in accordance with the quantity or quality being measured. For example, if it be desired to measure the humidity or the moisture content of air, paper, or of other material, such material may be allowed to pass between the plates of condenser 24' which may be conveniently fixed in spaced relation. As the moisture content or other quality of the passing material varies, the dielectric constant will vary and will therefore unbalance the bridge as explained before. The thickness of the paper or other material may be measured by causing it to pass between the fixed plates of condenser 24' or by causing it to vary the spacing between the plates of the condenser, thereby unbalancing the bridge. The latter arrangement, in which the spacing of the condenser plates is varied, may likewise be found useful in making measurements of the type described in connection with the apparatus of Fig. 2, as well as others which will readily occur to those skilled in the art.

My invention may also be used with the arrangement of Fig. 5 for measuring impedances such as capacity, inductance, and resistance. In this case, the impedance element being measured forms one of the arms of the bridge such as element 24' and the impedance element in arm 25' should be of the same species as that being measured. When employed for making measurements of this nature, the impedance element in arm 25' should be of such value as to cause unbalance of the bridge with an impedance element of average or standard value in arm 24'. This unbalance may then be balanced out in the measuring circuit as explained in connection with Fig. 2, and when the standard or reference impedance in arm 24' is removed and replaced by an unknown impedance, the indicating instrument will read plus or minus in proportion to the deviation of the unknown from the standard or reference impedance. Sensitivity may be adjusted in a manner similar to that described in connection with the arrangement of Fig. 2, that is, after adjusting the zero of the instrument, an impedance element of known deviation from the standard or reference value is placed in the arm 24' and the sensitivity control 72 is adjusted until the desired meter deflection is obtained. By using the recording element $M_2$ one may obtain an idea of the uniformity of impedance elements such as where they are being made by mass production methods and must be measured rapidly by a precision method.

The apparatus of my invention may also be employed to advantage in those cases where it is desired to have an accurate measurement of voltage variations in power circuits and the like.

In this case as with the bridge, the measuring circuit is adjusted to give a zero indication for some reference or average value of voltage applied to the input circuit and variations from this value may be read directly on the indicating instrument or recorder as desired.

It will thus be seen that I have provided electrical measuring apparatus which is capable of a wide variety of uses in the industrial arts. The scale of the instrument or instruments may be calibrated in absolute units, such as amperes, milliamperes, volts, millivolts, and the like, or in actual dimensions or values appropriate to the quantity or quality being measured. In still other applications it may be desirable to calibrate the instrument in terms of actual deviation or percentage deviation from a standard or reference quantity or quality.

While I have shown a particular embodiment of my invention and certain methods of operation embraced therein for the purpose of explaining its principle of operation, it will, of course, be understood that I do not wish to be limited thereto, since different modifications may be made both in the circuit arrangement and instrumentalities employed, and I contemplate by the appended claims to cover any such modifications as fall within the true spirit and scope of my invention.

What I claim as new and desire to secure by Letters Patent of the United States is:

1. In an electric measuring apparatus for measuring an alternating current quantity having a fixed component and a variable component, means for producing a unidirectional voltage having a fixed component proportional to said alternating fixed component and a variable component proportional to said alternating variable component, means for producing a second unidirectional voltage substantially equal in magnitude to the fixed component of said first unidirectional voltage, and means for measuring the difference between said first unidirectional voltage and said second unidirectional voltage.

2. Electric measuring apparatus for measuring an alternating current quantity comprising in combination an electron discharge device having an anode, cathode, and control electrode for amplifying said alternating current quantity, means in the plate-cathode circuit of said electron discharge device for producing a unidirectional voltage of constant magnitude, means for deriving a second unidirectional voltage proportional to said amplified alternating current quantity, and means for measuring the difference between said first unidirectional voltage and said second unidirectional voltage.

3. In a circuit for measuring alternating current quantities, a thermionic amplifier having cathode, anode, and control electrodes, input and output circuits for said amplifier connected respectively to said cathode and control electrodes and to said anode and cathode electrodes, means for deriving a rectified voltage from said output circuit proportional to the amplified value of an alternating current quantity to be measured, means including a resistance for producing a substantially constant unidirectional voltage, said resistance having at least a portion thereof common to said input and output circuits, said common portion serving as a biasing means for said control electrode, and means connected to measure the difference between said rectified voltage and the voltage across said resistance.

4. In an electric measuring apparatus for measuring the variable component of an alternating current quantity having a fixed component and a variable component, an amplifier for amplifying said alternating current quantity, means for producing a rectified electrical quantity proportional to said amplified alternating current quantity, means in said amplifier for producing a constant unidirectional electrical quantity substantially equal in magnitude to the amplified and rectified value of said fixed component, and means for measuring the difference between said rectified electrical quantity and said constant unidirectional electrical quantity.

5. In an electric measuring apparatus for measuring an alternating current quantity having a fixed component and a variable component, means for producing a unidirectional voltage having a fixed component proportional to said alternating fixed component and a variable component proportional to said alternating variable component, means for producing a second unidirectional voltage substantially equal in magnitude to the fixed component of said first unidirectional voltage, means for measuring the difference between said first unidirectional voltage and said second unidirectional voltage, and a variable resistance connected in circuit with said measuring means whereby the sensitivity of said measuring means may be changed independently of the zero reference of said measuring means.

6. In an electric measuring apparatus for measuring an alternating current quantity having a fixed component and a variable component, means for producing a unidirectional voltage having a fixed component proportional to said alternating fixed component and a variable component proportional to said alternating variable component, means for producing a second unidirectional voltage substantially equal in magnitude to the fixed component of said first unidirectional voltage, means for indicating the difference between said first unidirectional voltage and said unidirectional voltage, said last mentioned means including an indicating instrument having a high resistance in series therewith and a variable resistance in parallel therewith, and means in circuit with said high resistance for recording said voltage difference.

7. Electric gauging apparatus comprising in combination, an alternating current bridge adapted to be operated in an initially unbalanced condition to produce a voltage output at the zero reference position, means for modifying said initial unbalance and voltage output in accordance with variations in a quantity to be measured, means including an electron discharge device for amplifying said modified voltage, means for producing a rectified voltage proportional to the amplified value of said modified voltage, means in circuit with said electron discharge device for producing a substantially constant unidirectional voltage, and means to measure the difference between said rectified voltage and said unidirectional voltage.

8. Electric measuring apparatus for measuring an alternating current quantity comprising in combination, an amplifier including an electron discharge device having an anode, a cathode, and a control electrode, means connecting said alternating current quantity to said cathode and control electrode, a source of unidirectional anode supply voltage, a resistance element and a by-pass condenser connected in the anode-cathode circuit of said electron discharge device for deriving a second unidirectional voltage of constant magnitude, means connected in said anode-cathode circuit for deriving an alternating voltage proportional to the alternating current quantity to be measured, means for rectifying said alternating voltage, and means responsive to the difference between said rectified voltage and said second unidirectional voltage.

9. In an electric measuring apparatus for measuring the variable component of an alternating current quantity having a fixed component and a variable component, an amplifier having an input circuit and an output circuit for amplifying said alternating current quantity, means connecting said alternating current quantity to said input circuit, a source of unidirectional voltage, a transformer having primary and secondary windings, a first resistance element and said primary winding being connected in said output circuit, a condenser connected in shunt with said first resistance element for bypassing alternating current, a rectifier and a second resistance element connected in circuit with said secondary winding for obtaining a second unidirectional voltage proportional to said alternating current quantity, and measuring apparatus connected to respond to the difference in the voltage across said first and second resistance elements.

FREDERICK K. FLOYD.